Oct. 19, 1965  F. E. CARLSON ETAL  3,212,128
MOLD FILLING APPARATUS
Filed March 20, 1963  6 Sheets-Sheet 1

INVENTORS
FLOYD E. CARLSON
JOHN B. PRIGG
PER V. LEVIN
Hofgren, Wegner, Allen,
Stellman & McCord, Attys.

Fig. 11.

United States Patent Office 3,212,128
Patented Oct. 19, 1965

3,212,128
MOLD FILLING APPARATUS
Floyd E. Carlson, John B. Prigg, and Per V. Levin, Rockford, Ill., assignors, by mesne assignments, to Air Products and Chemicals Inc., Philadelphia, Pa., a corporation of Delaware
Filed Mar. 20, 1963, Ser. No. 266,589
2 Claims. (Cl. 18—4)

This invention relates to an apparatus for producing a foamable or foamed resin. More particularly this invention relates to such apparatus wherein separate foamable resin components are charged to a mixing zone, mixed and discharged through a nozzle to a mold.

It is a general object of this invention to provide a new and useful apparatus for producing foamable or foamed resins.

It is a further object of this invention to provide such an apparatus which is adapted for automatic control in the production of foamable resins.

Another object of this invention is to provide such an apparatus with a new and useful resin component or ingredient supply system which may include separate control of the temperature of ingredients and/or new and useful transmission means for control of rate and ratio of components to be mixed in the mixing zone.

Yet another object of this invention is to provide a new and useful mixer head, usable in such apparatus and capable of preventing undue swirling of mixed components during their discharge.

Still another object is to provide a new and useful mixer rotor configurated for improved mixer action in accordance herewith.

Still another object of this invention is to provide a new and useful flush system for cleaning a mixing zone or mixer head wherein the flush system is adapted for electrical actuation and includes an improved solvent drain system.

Other objects and advantages of the present invention will be apparent to those skilled in the art from the following description and from the drawings, in which.

While an illustrative embodiment of the invention is shown in the drawings and will be described in detail herein, the invention is susceptible of embodiment in many different forms, and it should be understood that the present disclosure is to be considered as an exemplification of the principles of the invention and is not intended to limit the scope to the embodiment illustrated.

In general operation of the illustrated system, components of a foamable resin are mixed in a predetermined ratio and charged at a controllable rate to a mold wherein the resin is permitted to foam and is cured. The components of the foamable resin in the illustrated system will be referred to as "prepolymer" and "resin," there being two components which are mixed to form the foamable resin. Of course, other systems employing, for example, greater numbers of components or components having compositions different from those specifically disclosed herein may be used.

Figure 1:
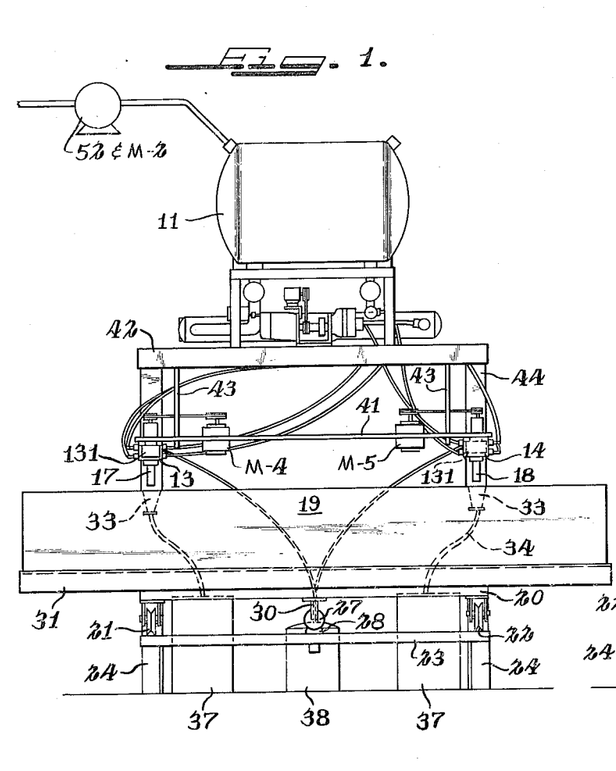
FIGURE 1 is a side view of an apparatus embodying a form of the present invention.
Figure 2:
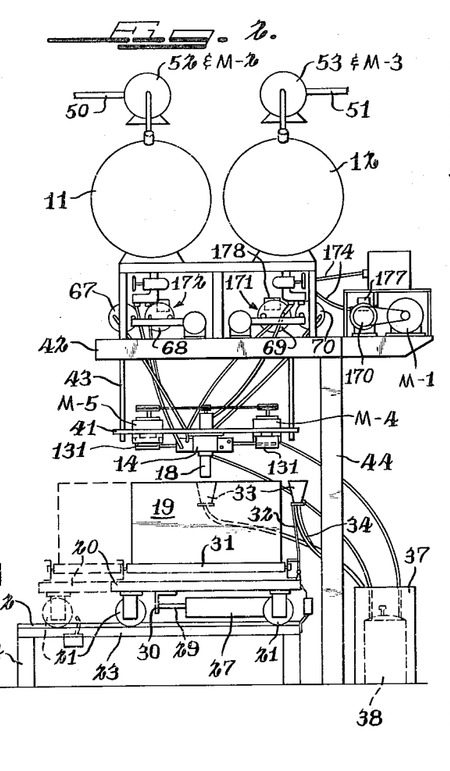
FIGURE 2 is an end view of the apparatus of FIGURE 1.

With more particular reference to FIGURES 1 and 2, prepolymer and resin are charged from tanks 11 and 12 respectively to each of mix heads 13 and 14. Mix heads 13 and 14 are the left and right mix heads of the illustrated apparatus and are of the same construction so that where the structure of one mix head is shown or described herein the structure of the other mix head is likewise illustrated. The mix heads, including the nozzles, are variable capacity mix heads having a capacity of from 5 to 150 pounds of resin per minute.

The prepolymer and resin components are mixed to form the foamable resin in mix heads 13 and 14 and the mixed foamable resin is discharged from the mix heads through left nozzle 17 and right nozzle 18 into mold 19 which is positioned on a movable cart 20. The system illustrated, as will be seen below, is adapted for manual or automatic operation.

Starting with cart 20, cart 20 is movable on wheels 21 over track 22 secured to platform or frame 23 which is supported on a base member or legs 24. Means are provided for moving the cart between a pour position shown in full lines in FIGURE 2 and a load position shown in dotted lines in FIGURE 2. In the pour position, the mold 19 is disposed directly under nozzles 17 and 18 for pouring of foamable resin into the mold from the open top thereof. The means for moving the cart between the two positions is in the form of an air cylinder 27 having one end secured by bracket 28 to platform 23 and having the air cylinder armature 29 secured to bracket 30 on cart 20. Between the platform 23 and mold 19 there is provided a roller conveyor 31 for lateral movement of mold 19 so that with cart 20 in the load position the mold 19 may be readily removed from the cart onto a conveyor for conveying the cart to a curing chamber.

The curing chamber may be of ordinary design and maintained at the temperature desired for curing the foamed resin within the mold 19. Curing procedures and conditions for various resin mixes are well known in the art and will not be described in detail herein.

Normally, prior to placing the mold in the curing chamber for curing purposes, a top member is added to the mold 19 to completely enclose the foamable or foamed resin.

Provided on the rear of cart 20 are a pair of upstanding bracket members 32 which support flush nozzles 33 behind mold 19. One flush nozzle 33 is provided for each mix head nozzle 17 or 18 and each flush nozzle 33 has a flush hose 34 which is a flexible hose extending from the flush nozzle to a flush tank 37. The flush funnels are provided so that with cart 20 in the load (pour) position the mix head nozzles may be cleaned by solvent from solvent tank 38, the spent solvent being discharged through nozzles 17 and 18 and into flush funnels 33 to flush tanks 37. Further, flush funnels 33 may serve to catch any drippings from nozzles 17 and 18 with cart 20 in the load position.

The mold 19 is of the general structure of molds used for molding blocks of foamed resin. The illustrated mold 19 is a rectangular container having a removable top and of such size to receive mixed foamable resin from two nozzles 17 and 18. The interior of the mold may preferably be coated, e.g. between each molding and curing operation, with a release agent such as wax for easier removal of the cured block from the mold. In view of the pressures which may be developed within mold 19 with the removable cover in place, such molds may be provided with baling or other straps around the exterior thereof to contain the mold, which may be constructed of wood, from rupturing.

Nozzles 17 and 18 depend from mix heads 13 and 14 which are supported from bridge 41. Bridge 41 also supports motors M–4 and M–5 on the mix heads and the bridge is in turn suspended from an upper frame 42 by frame members 43. Upper frame 42 is supported by legs 44. The upper frame 42 also serves to support tanks 11 and 12 and also supports the working components of the prepolymer and resin feed system which will be more particularly identified hereinbelow.

The foamable resin discharged through nozzle 17 and/or 18 may be any of the suitable well known liquid resins which are foamable to either a rigid or flexible foam. Usually such resins include reactive components which are mixed immediately prior to use and, for this reason, mixing heads 13 and 14, which include mixing chambers, are provided. The mixing chambers or mixing heads are supplied with resin components, each mixing head being supplied with predetermined proportions of the prepolymer component and resin component.

The foamable resin may, for example, be a polyurethane type foamable resin; however, other suitable foamable resins including the foamable styrenes and the like may be used. More specifically, as one of the components, i.e. the resin component, is introduced to the mixing heads, there may be a mixture of polyether resin, amine catalyst or amine and tin catalyst, a surfactant and a foaming agent which is usually a volatile or vaporizable foaming agent. The surfactant functions to modify the liquid gas interface and provide uniform cells of desired size during foaming. The other component or prepolymer components introduced by separate line to each mixing head and mixed with the resin component in the mixing head would be a polyisocyanate capable of reacting with the polyether resin, such as a partially reacted polyisocyanate.

Advantageously, one component, e.g. the resin component, may include all of the ingredients except one of the reactants necessary for the formation of the polymer. Thus, the resin component may include one monomer, e.g. a condensation polymerization monomer, the catalyst necessary or desirable for polymerization, the foaming agent, surfactants, fillers or other additives or modifiers while the other component, or prepolymer component, may consist solely of the other reactant necessary for the polymerization, e.g. the other condensation polymerization monomer. Of course, other segregation of ingredients between two or more components is entirely acceptable. Where more than two components are used, additional component storage tanks, e.g. similar to tanks 11 or 12, as well as additional supply lines and additional provision in the metering system and an additional inlet to the mixing chamber of each nozzle may be desirable or necessary. Such modification, however, would be made without departing from the spirit of the present invention and is considered to be within the scope hereof.

As a more specific example, the resin component of the foamable resin mix may include 30.60 parts by weight Wyandotte Chemical Resin EX–185 which is a polyether resin containing a flame retardant, 4.15 parts by weight Union Carbide LA–700 or Wyandotte Quadral, 16.50 parts by weight Freon 11 (boiling point 74.5° F.), Freon 11–B, Yukon 11, Genetron 11, Isotron or the like, all of which are low boiling fluorocarbons, 0.20 part by weight N,N,N',N'-tetramethyl 1,3-butane diamine, 0.05 part by weight dibutyl tin dilaurate and 1.0 part by weight Dow Corning DC–113 silicon fluid. The other component or prepolymer component of the foamable resin mix may be 47.50 parts by weight based on parts by weight of the ingredients of the resin component above, of partially reacted polymethylene polyphenylisocyanate. The reaction of the polyether with polyisocyanate to form the polyurethane is an exothermic reaction and foaming agent boils within the reaction temperature, e.g. preferably within a range of 60 to 110° F. Other suitable resin systems including various components of resin reactants and catalysts, modifiers, fillers or the like will be apparent to those in the art.

Figure 3:
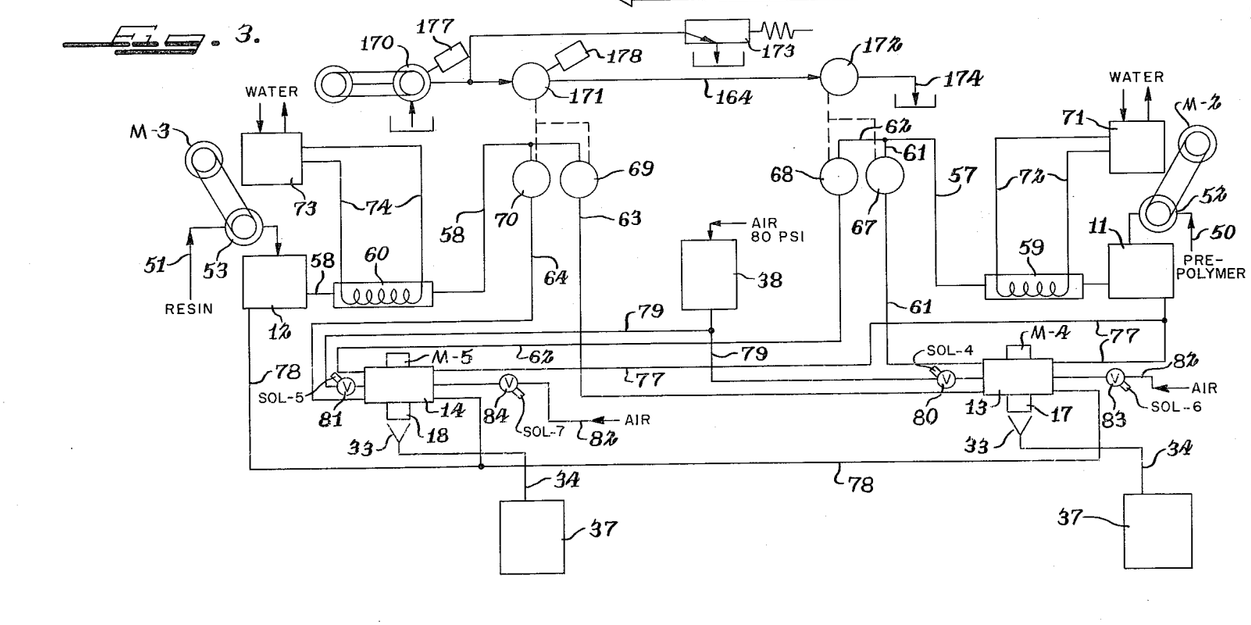
FIGURE 3 is a schematic diagram illustrating a system in the apparatus of FIGURE 1 for supplying materials to the mix heads of the apparatus.

The prepolymer and resin components and the system provided for feeding them to the mixer heads in the illustrated embodiment, is adapted for good rate and ratio control of prepolymer and resin components flowing to the mix heads. Referring now to FIGURES 1–3 in a more particular consideration of the apparatus illustrated, prepolymer and resin components may be charged through lines 50 and 51 by means of motors M–2 and M–3 of pumps 52 and 53 respectively. Motor M–2 and pump 52 are illustrated in FIGURES 1 and 2 as housed in the same housing as are motor M–3 and pump 53. Motor M–2 is the prepolymer transfer motor and pump 52 is the prepolymer transfer pump while motor M–3 is the resin transfer motor and pump 53 is the resin transfer pump. The resin and prepolymer charged through lines 51 and 50 may be obtained from any source, e.g. purchased drums, mixing vats, and the like.

Prepolymer and resin components may be withdrawn from tanks 11 and 12 through lines 57 and 58 which are equipped with heat exchangers 59 and 60 for the purpose of bringing the components up to the desired reaction temperature and decreasing their viscosity for easier flow to the mixing heads to the force for withdrawing the components from the tank 11 and 12. Lines 57 and 58 may be insulated if desired. The prepolymer flows from line 57 through lines 61 and 62 and the resin component flows from line 58 through lines 63 and 64 under the force of pumps 67 through 70, which pumps act to withdraw the prepolymer and resin components from tanks 11 and 12. Pumps 67 through 70 are hydraulic pumps driven by hydraulic fluid under pressure supplied by hydraulic motors as will be discussed hereinbelow. The hydraulic pumps 67 through 70 may be of the variable displacement type and the flow through lines 61 through 64 may accordingly be controlled or varied in each line as desired.

The heat exchangers 59 and 60 are supplied with heat exchange fluid from temperature control devices 71 and 73 by means of lines 72 and 74 respectively. The heat exchange fluid may be water which is heated to a preselected temperature by temperature controls 71 and 73 for use in heat exchange in the heat exchangers to maintain the prepolymer in line 57 and the resin component in line 58 at the desired temperature.

Prepolymer recirculation line 77 and resin component recirculation line 78 are provided for recirculating the components from the mixer heads prior to mixing the components when no mix is needed by the mixer heads. Thus, between resin pouring operations the controlled rate of circulation of the components is maintained and the unused components at the mixing head are merely recirculated to tanks 11 and 12.

Solvent supply lines 79 supply solvent from solvent tank 38 to each of the mixing heads for the purpose of cleaning the mixing heads. The solvent supply to mixing head 13 is controlled by solvent supply valve 80 which may be opened and closed by solenoid Sol–4 in the usual manner of a solenoid actuated valve, while the flow of solvent to mixing head 14 is controlled by solvent supply valve 81 which is in turn controlled or opened and closed by solenoid Sol–5. Thus, when it is desired to flush or clean either of the mixing heads, the appropriate solvent supply valve is opened by means of its controlling solenoid and solvent is introduced into the mixing head, discharged through the nozzle 17 and/or 18, received by a funnel 33 and discharged to a flush tank by means of a line or hose 34. Solvent tank 38 may be pressurized with air, nitrogen or the like in the usual manner for obtaining solvent flow therefrom.

A supply of air, preferably dry air, or other drying gas may be charged to heads 13 and/or 14 by means of line 82 to clean or evaporate the remaining solvent from the mixing head as desired. The air supply to mixing head 13 is controlled by valve 83 which may be opened or closed by means of solenoid Sol–6 while the air supply to mixing head 14 is controlled by measuring valve 84 which may be opened and closed responsive by Sol–7. Thus, upon cleaning of the mixing heads with solvent, means are provided for removing the remaining solvent from the mixing heads.

Figures 4, 5:
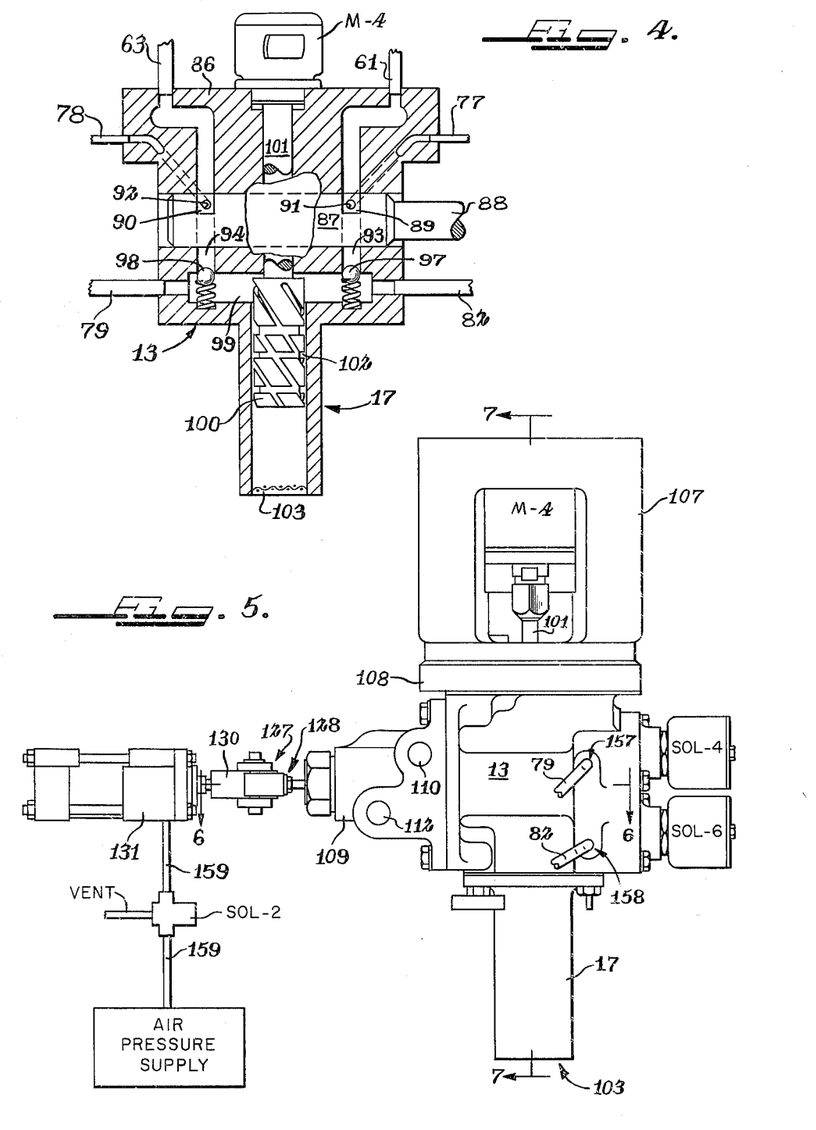
FIGURE 4 is a schematic diagram of a nozzle usable in the embodiment of FIGURES 1 through 3.
FIGURE 5 is a view of a mix head usable in accordance with this invention, e.g. in the embodiment of FIGURES 1 through 3.

FIGURE 4 shows a schematic diagram of a suitable mix head 13 and nozzle 17. Accordingly, there is illustrated a valve casing or fitting identified by reference numeral 86 of a double three-way valve. The valve member 87 is a solid cylindrical member rotatably mounted in fitting 86 and rotatably operable by extension handle 88. Valve member 87 has chordal grooves 89 and 90 cut therethrough forming two spaced chordal passages through member 87 contained within fitting 86. With valve member 87 in the position shown in full lines in FIGURE 4, the chordal passages direct prepolymer and resin components entering lines 61 and 63 through ports 91 and 92 and into return lines 77 and 78 for return to tanks 11 and 12. With valve member 87 in the position shown in dotted lines, the chordal passages 89 and 90 direct components charged through lines 61 and 63 through ports 93 and 94 respectively and into chamber 99, past wall check valves 97 and 98 and into chamber 99. The check valves 97 and 98 are spring-urged to seated position but the force of fluid passing through ports 93 and 94 is sufficient to unseat the ball members against the urging of the spring and permit entry of the components into chamber 99.

In chamber 99, the components may be picked up by mix blade 100 which is rotated by shaft 101 driven by motor M–4. The components from chamber 99 are urged through nozzle mixing conduit 102 within nozzle 17 and the components are thoroughly mixed by the mix blade 100 during their passage through conduit or chamber 102. Thus, the illustrated pouring head uses a grooved cylindrical rotor or mix blade 100 which discharges through a sleeve having a transverse screen 103 downstream from the rotor. Screen 103 functions to stop swirling of liquid as it is discharged from the nozzle for better control of liquid flow into mold 19 so that liquid resin will not be thrown by centrifugal force from the nozzle end. The extended sleeve of the nozzle below the rotor also assists in stopping the swirling action.

Referring more generally to the mix head structure diagrammed in FIGURE 4 and also referring to FIGURE 3, it is apparent that the valve member 87 may be rotated by extension 88 to select direction of resin entering the mix head for either return to storage or for discharge through the nozzle. With the valve member in the return to storage position as illustrated in full lines in FIGURE 4, solvent may be charged as described above through line 79 and into chamber 99 and thence through nozzle 17 with motor M–4 operating to turn rotor 100. The solvent is prevented from entering ports 92 and 93 by check valves 97 and 98 which are seated under the urging of their springs and under pressure of the solvent. When sufficient solvent has been charged to the mixing head for cleaning of chamber 99 and passageway 102 and screen 103 as well as rotor 100, the charging of solvent may be discontinued, e.g. by closing valve 80, and a high pressure air stream may then be charged, e.g. by opening valve 83, via line 82 into chamber 99 and thence out through nozzle 17. The air blast may be used to evaporate or remove residual solvent from the mix head, e.g. for shutdown or where it is desired to clean the head for other purposes. During the charging of solvent and/or air through chamber 99 and out of nozzle 17, cart 20 (FIGURES 1 and 2) is in the load position with funnel 33 positioned immediately below the outlet of nozzle 17 for draining of solvent and resinous material through line 34 to flush tank 37.

Figure 6:
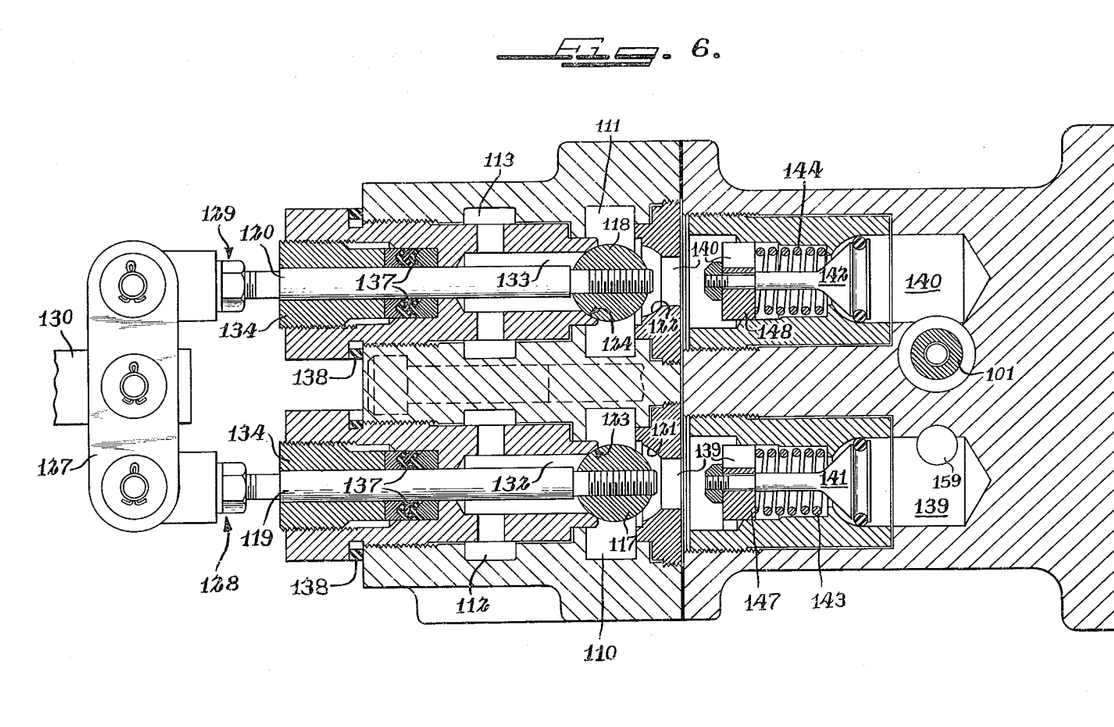
FIGURE 6 is an enlarged section along line 6—6 of FIGURE 5.
Figure 7:
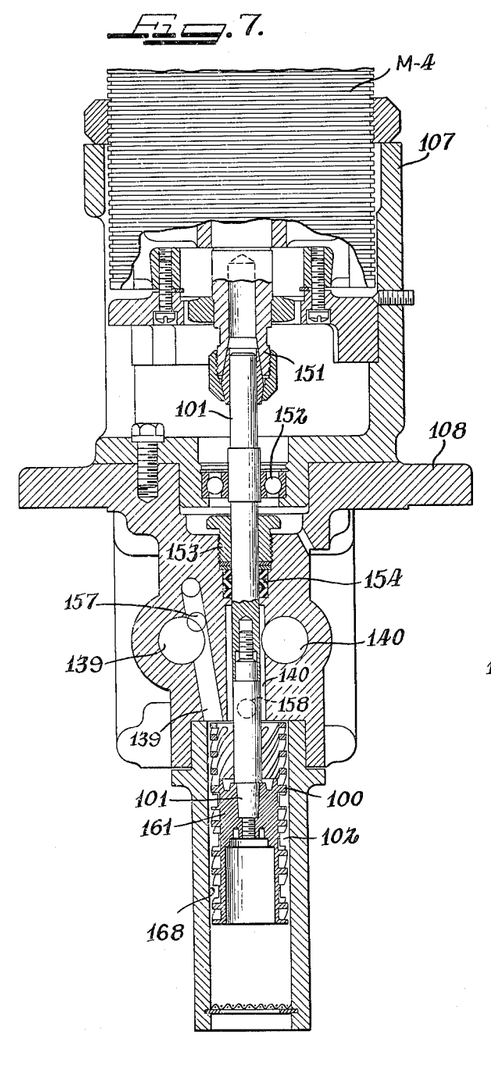
FIGURE 7 is an enlarged section of smaller scale than FIGURE 6 along line 7—7 of FIGURE 5.

Turning now to FIGURES 5–7, there is illustrated a modified mix head assembly operable generally in accordance with the mode of operation of the mix head illustrated schematically in FIGURE 4. In the device illustrated, a motor housing 107 containing motor M–4 is mounted on a mixer head housing 108 having an end cap 109. The device has a resin component inlet and inlet chamber 110 and a prepolymer component inlet and inlet chamber 111. Also provided is a resin component outlet for return chamber 112 and a prepolymer component outlet or return chamber 113 for returning unmixed resin and prepolymer to tanks 12 and 11 respectively, by way of lines 78 and 77. Resin inlet 110 may be charged with resin from a suitable line such as line 63 of FIGURES 3 and 4 and prepolymer inlet 111 may be charged with prepolymer from a suitable source such as line 61 of FIGURES 3 and 4.

The valving (FIGURE 6) of resin and prepolymer components between the return lines and the nozzle 17 is accomplished by means of valving members 117 (for the resin component) and 118 (for the prepolymer component) carried by valve stems 119 and 120. Valving member 117 is movable between a valve seat 121 for resin return and a valve seat 123 for resin charged to the nozzle. While valving member 118 is movable between a valve seat 122 for prepolymer return and a valve seat 124 for prepolymer charged to the nozzle. Valve stems 119 and 120 are threaded into and locked to pivotally mounted members on an air cylinder equalizer assembly 127 by nut and lock washer assemblies 128 and 129 respectively. The air cylinder equalizer assembly 127 is pivotally secured to armature 130 of air cylinder 131. Air cylinder 131 is operable between two positions, one with the armature 130 extended for seating of valve members 117 and 118 on seats 121 and 122 respectively and the other positioned with armature 130 retracted for seating of valving members 117 and 118 on seats 123 and 124 respectively. In the first position, i.e. with the valving members 117 and 118 seated on seats 121 and 122 respectively, the resin and prepolymer components are returned to storage via resin return passage 132 and prepolymer return passage 133 and through outlets 112 and 113 respectively, thence through return lines 78 and 77.

Valve stems 119 and 120 are slidably mounted in the housing 108 through packing lands 134 and male and female bronze adapters 137. Gaskets 138 are provided to seal the assembly against leakage.

With valve members 117 and 118 in the second position, i.e. seated on seats 123 and 124 respectively in the position shown in FIGURE 6, resin and prepolymer components from inlets 110 and 111 respectively are charged through nozzle charge passageways 139 and 140 and into nozzle mixing conduit 102 (FIGURE 7). Disposed within passageways 139 and 140 are check valving members 141 and 142 respectively to obstruct back-flow through the passageways, e.g. to prevent solvent from entering the resin or prepolymer components behind the check valve members during flushing or nozzle cleaning operations. Check valve members 141 and 142 are spring-loaded by springs 143 and 144 which bias between the housing and anchor members 147 and 148 secured to valve members 141 and 142. Thus, springs 143 and 144 normally urge valve members 141 and 142 to the left as shown in FIGURE 6. However, flow of components through passageways 139 and 140 from the left of valve members 141 and 142 is sufficient to unseat the valve members and permit the proper desired flow. It should be noted that anchor members 147 and 148 are each provided with ports therethrough that define a portion of passageways 139 and 140.

It is apparent that upon actuation, motor M-4 will drive rotor 100 by means of drive shaft 101 for mixing of the components from passageways 139 and 140 within mixing conduit 102 for discharge from the end of the nozzle through screen 103, the function of which has been mentioned hereinabove. Shaft 101, secured at one end to the armature of motor M-4 by means of a suitable coupling 151, is mounted in housing 108 by means of ball-bearings 152 and extends through a packing nut and washer assembly 153 and a garlock 154. Thus, shaft 102 is rigidly and rotatably supported in housing 108.

The solvent flush and air blow system of the nozzle of FIGURES 5–7 is provided by means of solvent inlet 157 and air inlet 158. Solvent inlet 157 extends from the exterior, e.g. from attachment to line 79 as illustrated in FIGURE 3 and as shown in FIGURE 5, to passageway 139 as shown in FIGURE 7. Air inlet 158 extends from the exterior, e.g. from line 82 of FIGURE 3 to passageway 140 adjacent mixing conduit 102 as illustrated in FIGURE 7. Solenoid Sol–4 carries a valve plunger (not shown) corresponding to valve 80 of FIGURE 3. With solenoid Sol–4 in its de-energized condition, the valve plunger blocks the passage of solvent through passageway 157 but upon energization of solenoid Sol–4, solvent is permitted to flow through passageway 157 and thence through passage 139 and mixer conduit 102 for discharge from nozzle 17 as described hereinabove. Solenoid Sol–6 also carries a plunger on the end of its armature which, with solenoid Sol–6 de-energized, blocks passage 158 and the flow of air therethrough. Upon energization of solenoid Sol–6, air is permitted to pass through passage 158 for blowing out conduit 102. The valving members controlled by solenoids Sol–4 and Sol–6 are conventional and their employment to block the conduits or passageways 157 and 158 is also conventional.

Solenoid valves Sol–2 and Sol–3 (FIGURE 5) are three way valves provided for supplying air to the air cylinders 131 respectively of mixer heads 13 and 14 and for venting air from cylinder 131. As illustrated in FIGURE 5, solenoid valve Sol–2 is provided in the pressure air supply 159 for air cylinder 131. With solenoid Sol–2 energized, air is permitted to flow through line 159 and into air cylinder 131 to urge armature 130 (normally spring biased to the right) to the left as positioned in FIGURE 5, thereby seating valve members 117 and 118 on seats 123 and 124 as illustrated in FIGURE 6 for passage of resin and prepolymer components through passages 139 and 140 respectively. Upon de-energization of solenoid Sol–2, the solenoid valve vents air from cylinder 131, permitting spring-urging of armature 130 to the right to cause seating of valve members 117 and 118 on seats 121 and 122 for return of resin and prepolymer to tanks 12 and 11. Solenoid valve Sol–3 similarly controls the air supply to cylinder 131 of head 14.

Figure 8:
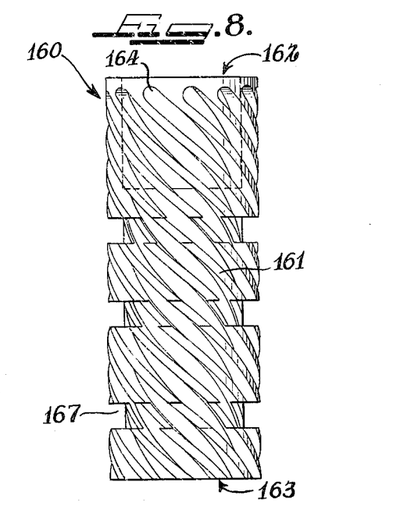
FIGURE 8 is a perspective view of a mixer blade usable in the mix head of FIGURES 5–7.
Figure 9:
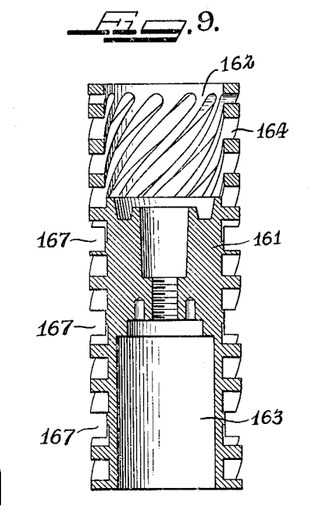
FIGURE 9 is a partial section of the mixer blade of FIGURE 8 showing internal structure.

An improved mix blade or rotor is provided in accordance herewith. Referring to FIGURES 7 through 9, the illustrated rotor 100 is generally of tubular form including a tubular structure such as indicated at 160 with a cross brace 161 blocking passage between the chambers 162 and 163. Cross brace 161 provides a convenient position for attachment of a driving shaft for rotating rotor 100. A plurality of pivotal or spiral slots 164 is provided for communication between chambers 162 and the exterior of the tubular structure 160. Further, a plurality of circumferential or cross grooves 167 is included in the outer surface of tubular structure 160. Rotor 100 is adapted to be disclosed in a nozzle conduit 102 and, in cooperation with the inner cylindrical wall 168 of conduit or passageway 102, is capable of causing intimate mixing of separate components, especially where one component is introduced into the inner chamber 162 and the other component is introduced between tubular structure 160 and cylindrical wall 168 at the same end as the inner chamber 162. The rotor, upon rotation, functions to mix the components thusly introduced and carry the mixed components down conduit 102 and through screen 103 for discharge, e.g. into a mold. The cooperation of the helical slots, inner chamber, external grooves and cylindrical wall of the tubular passageway has been found to provide excellent mixing in comparison with other rotor configurations, e.g. screw conveyors and the like. In addition to performing the mixing function, the rotor also serves to convey the mixed resin from the tubular nozzle conduit.

Figure 10:
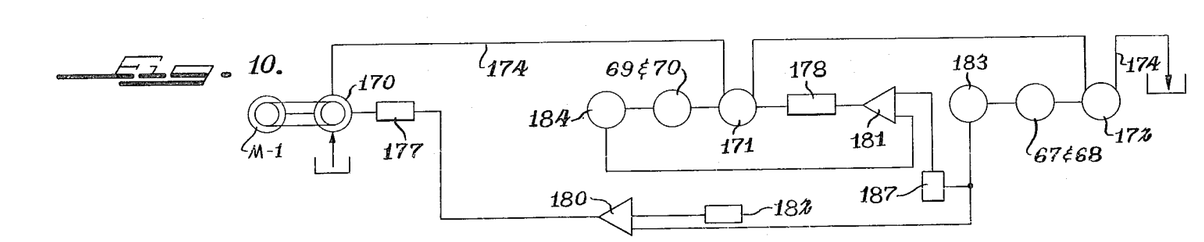
FIGURE 10 is a schematic diagram of a feed control system usable in the embodiment of FIGURES 1 through 3.

Returning again to FIGURES 1–3 and further now to FIGURE 10, a variable displacement hydraulic pump 170 is belt-driven by hydraulic drive motor M–1. Pump 170 in turn drives variable displacement hydraulic motors 171 and 172 in hydraulic series with pump 170. A pressure release valve 173 is provided in the hydraulic circuitry for releasing over pressure to drain. The hydraulic fluid is withdrawn by pump 170 from a reservoir and pumped through line 174 through motors 171 and 172 to drain, e.g. back to the hydraulic reservoir, resulting in rotation of the drive shafts of motors 171 and 172. Motor 171 drives pumps 69 and 70 and motor 172 drives metering pumps 67 and 68, the function of which has been described hereinabove. Pumps 67 through 70 are fixed displacement hydraulic pumps, the displacement of pump 170 may be varied by means of actuator 177, and the displacement of pump motor 171 may be varied by means of actuator 178.

In the illustrated system, motor 172 is a master product motor and pumps 67 and 68 are master product pumps while motor 171 is a slave product motor and pumps 69 and 70 are slave product pumps. Although motor 172 is a variable displacement motor, the displacement of the motor is adjusted to a fixed value and the output from motor 172 is used to drive pumps 67 and 68 and is also useful in controlling the displacement of pump 170 and/or motor 171 for varying the rates of flow of components being pumped from tanks 11 and 12 or varying the ratio of such components, e.g. the ratio of the component from tank 12 to the component of tank 11.

Thus, in accordance with the present invention, there may advantageously be provided means for maintaining the correct ratio of resin component to prepolymer component charged to the mix heads 13 and 14. An exemplification of such means will be more clearly understood with reference to the schematic diagram of FIGURE 10. The rate and ratio control illustrated is a positioning control utilizing 2 amplifiers 180 and 181 in conjunction with two rotary actuators 177 and 178.

Each of the amplifiers may be, for example, a relay output servo amplifier with a 3 to 12 mv. D.C. sensitivity, i.e. an input error in excess of 3 mv. D.C. volts causing one of two output relays to close depending upon the phase of the error. Each of the actuators may be, for example, an actuator having a two-phase motor with an internal phase shift capacitor with an output speed of about 1¾ r.p.m. at 55 in./lbs. torque. Other amplifiers and actuators may be used as will be apparent to those in the art.

In the system exemplified by the schematic drawing of FIG. 10, the output relays of amplifiers 180 and 181 are connected between the 115-volt A.C. power supply line for actuators 177 and 178 and the power input terminals of actuators 177 and 178 respectively, in such a manner that one relay, upon energization, will cause actuator rotation in one direction and the other relay, upon energization, will cause actuator rotation in the opposite direction.

The error voltage fed to amplifier 180 is the difference between the "rate set" voltage preselected by potentiometer 182 and the tachometer voltage from master pump tachometer 183 (on the outlet of pump 68) representing the flow rate through master component (prepolymer component) pumps 67 and 68. Actuator 177 and amplifier 180 are properly phased and actuator rotation will cause the adjustment of the displacement of pump 160 until the error voltage decreases to zero. When the error voltage decreases to zero (within the sensitivity of the amplifier 180), the master component (prepolymer) is flowing under the urging of master component pumps 67 and 68 at the commanded rate as preselected at rate set potentiometer and the actuator 177 stops, the error voltage having ceased. Of course, any variance in the rate of flow of master component from the commanded rate will cause the actuator 177 to change position as necessary to keep the rate of flow equal to the preset rate as preselected by adjustment of potentiometer 182.

The error voltage to the amplifier 181 is the difference between the slave pump tachometer voltage from tachometer 184 and the "ratio set" voltage which may be preselected by adjustment of potentiometer 187. The operation of amplifier 181 is the same as amplifier 180. However, because the "ratio set" potentiometer 187 is excited by a signal from the master component tachometer 183, the commanded ratio is referenced to the master component flow rate rather than a fixed reference. The commanded ratio can be varied above or below the commanded rate within the range of operation of the particular components selected and especially the slave component pumps 69 and 70.

It will be apparent that in a system such as illustrated in FIGURE 10 for control of the prepolymer and resin feed by controlling the disposition of the slave component pump and the electric motor driven pump 170 for ratio and rate respectively, the rate of flow of components may be widely varied while maintaining the ratio at a preselected value, a distinct advantage in the control system of the illustrated embodiment.

Figure 11:
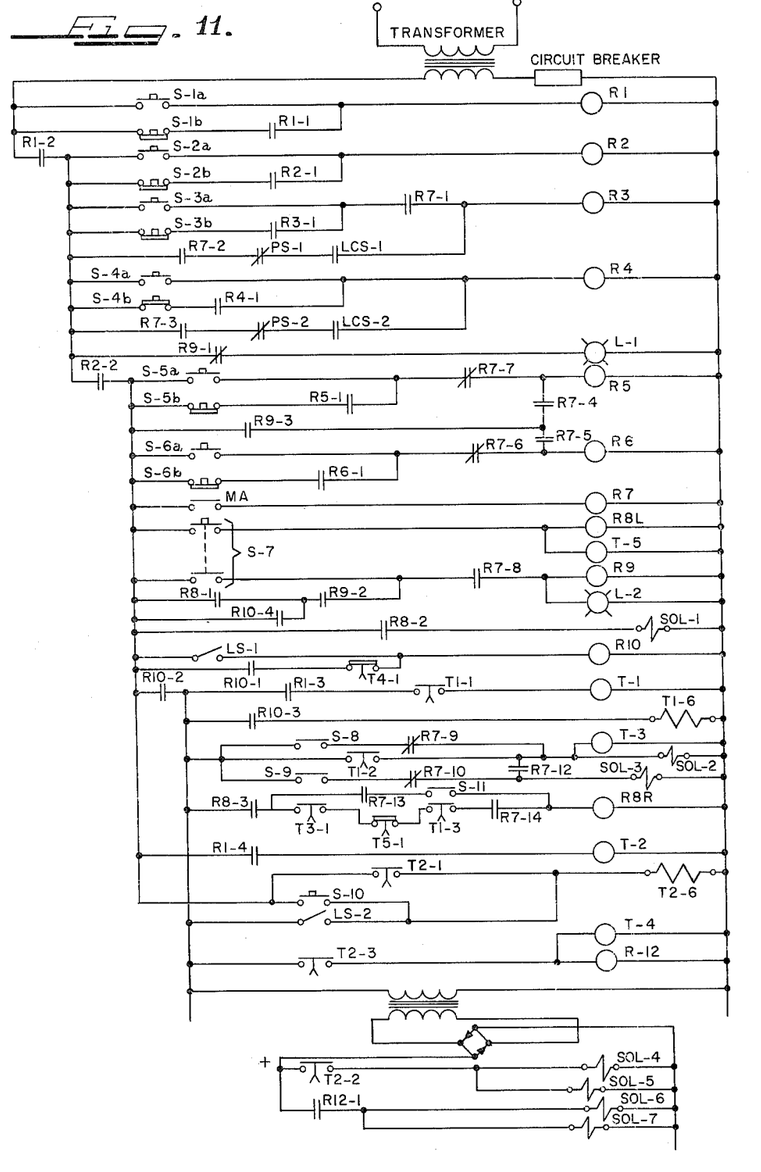
FIGURE 11 is a wiring diagram of a control system for manual or automatic control of the apparatus of FIGURES 1 through 3.

Suitable electric circuitry is illustrated in FIGURE 11. Power for the energization of the circuitry is provided by a transformer and the power supply includes an in-line circuit breaker. Switches S–1a through S–11 are each of the push button variety to be pushed downward as shown in FIGURE 11 for making or breaking contact. The switches are spring-return switches and are thus biased to their raised position as shown in FIGURE 11. Those switches shown in electrical contact are normally closed switches and are depressed to open the circuit while those switches shown out of electrical contact are normally open switches and are depressed to complete the circuit.

Switch S–1a and S–1b are the master start and stop switches respectively. In order to operate the apparatus switch S–1a is depressed resulting in actuation of relay R1 which is held in by closure of relay contact R1–1 and through stop switch S1b. It is apparent that depressing stop switch S–1b will break contact with relay R1 thereby releasing contact R1–1 to its normally open position to de-energize relay R1 regardless of release of switch S–1b again to its normally closed position. Relay R1 also closes contacts R1–2, R1–3, and R1–4. Closure of contact of R1–2 energizes the remainder of the circuitry of the diagram. Closure of contact R1–3 readies timer T–1 for actuation through contact T1–1 upon engagement of the timer clutch T1–C. Closure of contact R1–4 readies T–2 for action.

Hydraulic drive motor start switch S–2a is also depressed preparatory to operation of the device. Switch S–2a actuates relay R2, held in through relay contacts R2–1 and normally closed hydraulic drive motor stop switch S–2b. Switches S–2a and S–2b, through relay R2, control the starting and stopping of hydraulic drive motor M1. Relay R2 has an additional pair of contacts R2–2 which actuate the circuitry for control of polymer mixing and pouring.

Manual operation for production of foamed material, for experimental pouring, for testing of polymer mix or for machine calibration may be performed by placing switch MA in open or "manual" position and by operating the following switches manually in any desired sequence: prepolymer transfer motor start switch S–3a or stop switch S–3b for controlling prepolymer transfer motor M2 through relay R3; resin transfer motor start switch S–4a or stop switch S–4b for controlling resin transfer motor M3 through relay R4; left mixer motor start switch S–5a or stop switch S–5b for controlling motor M4 through relay R5; right mixer motor start switch S–6a or stop switch S–6b for controlling motor M5 through relay R6; momentary switches S–8 and/or S–9 to start pouring from the left and right mix heads 13 and 14 respectively; and/or momentary switch S–10 for flushing and air blowing nozzles 17 and 18.

Relays R3, and R4 are held in through stop switches S–3b and S–4b and relay contacts R3–1 and R4–1 respectively. It is apparent that any of the stop switches will cause deactivation of the relays and motors controlled thereby. Upon depressing switches S–5a and S–6a for starting left and right inner motors M4 and M5 respectively relay R5 holds in through contacts R5–1 and relay R6 holds in through contacts R6–1.

For automatic operation, the master start switch S–1a and hydraulic drive switch S–2a are depressed as above. The cycle button switch S–7 is thereby actuated. Switch MA is then closed or thrown to "automatic" energizing relay R–7.

Energization of relay R7 opens contacts R7–1, R7–6, R7–7, R7–7, R7–9 and R7–10, and closes contacts R7–2, R7–3, R7–4, R7–5, R7–8, R7–11, R7–12, R7–13 and R7–14. The resulting switching of contacts R7–1 through R7–4 results in cutting switches S–3a through S–4b out of circuitry for control of relays R3 and R4 and further results in control of relays R3 and R4 by means of the series of switches PS–1 and LCS–1 and the series of switches PS–2 and LCS–2 respectively. Switches PS–1 and PS–2 are manually operable emergency switches which may be opened to break the circuitry to relays R3 and R4 respectively.

Switches LCS–1 and LCS–2 are automatic level control switches of conventional design and in conventional usage for controlling the level of prepolymer in tank 11 and resin in tank 12 respectively in accordance with a preselected level in each tank, e.g. prepolymer and/or resin may be charged to a predetermined high level by actuation of the proper transfer motor upon decrease of the prepolymer and/or resin level below a lower predetermined limit.

The switching of contacts R7–4 through R7–7 results in cutting off control of the left and right mixer motors M4 and M5 from switches S–5a through S–6b and further results in providing for initiation of the pouring cycle by means of switch S–7, an SPDT switch. To initiate the cycle, switch S–7 is closed momentarily, switch S–7 being a spring-return button switch. Closure of switch S–7 actuates relay R8, timer T5 and relay R9. Relay R8 is a double-acting relay which is actuated left or right to make and break various circuits. The two sides will be referred to as R8L and R8R, and when R8L or R8R is energized, the other is de-energized.

Contacts R8–1 and R9–2 hold in relay R9 and lamp L2, which is an indicator lamp indicating that the apparatus is on automatic control. Relay R9 further opens contacts R9–1 to turn off lamp L–1 which is a clear signal indicator for automatic cycle start. Contact R9–3 is also closed, and relays R5 and R6 are energized and held in to actuate the left and right mixer motors M4 and M5 for causing flow of prepolymer and resin to the mixing chamber 102. Motors M4 and M5 are held energized through relays R8L or R10 until the end of the flush cycle.

Relay R8L closes contacts R8–2 and R8–3. Contacts R8–2 actuate solenoid valve Sol–1 which, via air cylinder 27, moves the cart into pouring position and holds the cart in pouring position. Timer T5 is an override timer which opens contact T5–1 for a preset length of time to hold the cart in pour position until the cart is ready for return to loading position by maintaining the circuit to R8R open until expiration of the preset length of time, at which time the remainder of the circuitry energizing the release side of relay R8L, i.e., R8R, will be completed. Closure of contact T5–1 will then cause release of solenoid Sol–1 and cause air cylinder 27 to return the cart to load position.

Returning now to relay R7, energization of the relay breaks control of pouring from the left and right nozzles by switches S–8 and S–9, respectively. Contacts R7–11 and R7–12, now closed, provide for actuation of solenoid Sol–2 and Sol–3 and timer T3, by means of timer contact T1–2.

At the end of the stroke of air cylinder 27, with the cart moved to pour position, limit switch LS–1 is actuated, energizing control relay R10, closing contacts R10–1 through R10–4, and extending energy to the remainder of the circuit, starts the timer motor of timer relay T1, and engages the electrical clutch T1–C of timer T1 which initiates and terminates pouring by the mix heads 13 and 14. Contact T1–1 remains closed during the entire pouring operation, i.e., until the timed period expires and T1–1 reopens ending the pouring operation. Solenoids Sol–2 and Sol–3, which actuate the three-way valves 117 and 118 in each of mix heads 13 and 14, are energized by contact T1–2 to effect the pouring operation for a predetermined timed interval sufficient to deposit the desired predetermined correct amount of foamable resin in the mold, actuation of Sol–2 and Sol–3 resulting in mixing of foamable resin for discharge to the mold and deactuation of Sol–2 and Sol–3, resulting in return of unmixed resin and prepolymer componnets to storage and shutting off flow to the mold. Relay R10 holds in through contact R10–1 until timer T4 releases contact T4–1 thereby de-energizing relay R10 at the end of the timed air blowing cycle.

Contact T1–2 energizes timer T3 to hold the cart in pour position a predetermined length of time after timing out of T1 in order to insure that substantially all of the mix is discharged from the mix-head nozzle. When the timing of T3 times out (after solenoid valves Sol–2 and Sol–3 are de-energized) control relay R8L is released by R8R, resulting in de-energizing of solenoid valve Sol–1, thereby causing the cart to return to load position. It is of interest that the relay R8L can be released in an emergency by depressing the emergency cart return switch S–11 which will automatically cause energization of relay R8R, releasing relay R8L and de-energizing solenoid Sol–1 for return of the cart to load position whenever desired or deemed necessary.

When the cart returns to load position, limit switch LS–2 is tripped energizing the electric clutch T2–C of timer T2. Timer T2 is a three-switch circuit reset timer which controls the sequence time for flushing and air flow of the mix head. One circuit completed by contacts T2–1 counts a period which switch S–7 may be depressed to start a new pouring cycle without initiation of flushing and flowing operations by disengaging electric clutch T2–C for the timed period. If button S–7 is not depressed, timer T2 energizes, via contacts T2–2, the mix head solenoid valves Sol–4 and Sol–5, which permit solvent to flow into mix heads 13 and 14 for flushing the heads. Thereafter, in the third circuit completed during the last timed period, timer T2 energizes control relay R12 and timer T4. Relay R12, via contact R12–1, energizes solenoid valves Sol–6 and Sol–7, releasing air for blowout of heads 13 and 14.

When delay timer T4 times out, control relay R10 is de-energized, resulting in de-energization of the automatic cycle and resetting the apparatus for the next cycle. Accordingly, timer T4 causes contact T4–1 to open and de-energize relay R–10, opening contact R10–4 for de-energization of relay R9, which opens contact R9–3 to stop the mixer motors until reactuated by switch S–7 for the next pouring cycle.

If the next pouring cycle is started by switch S–7 before timer T2 times the period prior to engagement of clutch T2–C and initiation of the flush and air blow operations, timer T2 is reset, when contact T2–1 reopens, switch LS–2 has also reopened and the electric clutch T2–C is de-energized. Timer T2 is then spring returned to reset for timing the first interval when clutch T2–C is again engaged by closure of switch LS–2.

It is an advantage of the present system that it lends itself to convenient control. The control swicthes or push buttons may conveniently be located on a single panel at a central button station for control of the entire operation therefrom. The rate and ratio of ingredients to be charged to the mixing head or heads may advantageously be controlled by a system which accurately adjusts the metered rates and ratios with reference to manually selected values. As still another advantage, poured batch sizes can be maintained with good repeatability through the use of timing circuitry so that when the pouring operation is initiated by actuating a mix head three-way valve to "open position" (with respect to discharge of resin to the mixing chamber), the timing circuit causes closing of the three-way valve at the end of a timed interval and further causes recycle of unmixed resin to storage. The control system permits the use of a variable capacity mixing head to advantage. Further, resin components or ingredients may be continuously circulated through the mix head for simultaneous and instant delivery to the mixing chamber at the beginning of a pouring operation. Many other advantages of the present invention may be apparent to those skilled in the art.

We claim:

1. A mold-handling device for moving a mold into and away from pouring position with respect to a resin discharge nozzle, which comprises track means extending between a pouring position and a second position, a mold receiving platform, wheels rotatably mounted on said platform and positioned to travel on said track means for carrying said platform between said pouring position and said second position, upstanding bracket means on said platform, funnel means carried by said bracket means, flexible conduit means attached at one end to and extending from the lower end of said funnel means, a drainage receptacle adapted to receive drainage from the other end of said flexible conduit means and means for moving said platform over said track between said pouring and second positions, said funnel being disposed in said pouring position away from association with said nozzle means and being disposed in said second position in receiving association with said nozzle means whereby with said platform in said second position said funnel is in position to receive resin from said nozzle.

2. An apparatus for producing a foamed resin which comprises a cylindrical passageway defining a mixing chamber for receiving a plurality of liquid components of a foamable resin, a plurality of conduits for directing said liquid components as separate streams to said mixing chamber, means for controlling the temperature of the ingredients flowing from said conduits to said mixing chamber, pump means in each of said conduits for charging components therethrough and into said mixing chamber, variable displacement hydraulic transmission means for driving said pump means for flowing the components through said conduits, means for controlling said hydraulic means for varying the rate of flow of components through each of said separate conduits, means controlling said hydraulic means for varying the ratio of flow rate in one of said conduits to flow rate in the remainder of said conduits, rotary mixer means in said mixing chamber for mixing the components, an elongate discharge nozzle for discharging mixed components from said mixing chamber at a discharge station, said nozzle being of sufficient length to decrease swirling of liquids being discharged from said passageway, a perforated member disposed across the discharge end of said nozzle of sufficient mesh to further reduce and substantially eliminate swirling, electrically responsive means for flushing resin from said mixing chamber, carriage means supporting a mold receiving platform, track means extending between a pouring position adjacent said discharge station and a second position removed from said station, said carriage riding on said track means between said positions, means on said platform for receiving drainage of resin mix from said nozzle at said discharge station with said carriage in second position, a receptacle receiving drainage from said carried means, and means for moving said carriage on said track between said positions, said carried means being disposed away from association with said nozzle means with said carriage in said pouring position and being disposed in drip-receiving association with said nozzle means at said station with said carriage in said second position.

References Cited by the Examiner

UNITED STATES PATENTS

| | | | |
|---|---|---|---|
| 1,558,580 | 10/25 | Bishop | 141—69 |
| 1,740,032 | 12/29 | Pecard | 141—233 |
| 2,453,088 | 11/48 | Dulmage | 259—7 X |
| 2,610,643 | 9/52 | Goff | 137—99 |
| 2,764,565 | 9/56 | Hoppe et al. | 259—7 X |
| 2,774,576 | 12/56 | Frank | 259—8 |
| 2,792,855 | 5/57 | Walts | 141—87 |
| 2,798,697 | 7/57 | Soden | 259—8 |
| 2,799,288 | 7/57 | Knight | 137—98 |
| 3,141,865 | 7/64 | McEvoy | 259—7 X |

LAVERNE D. GEIGER, *Primary Examiner.*